United States Patent [19]

Moore

[11] Patent Number: 4,632,337

[45] Date of Patent: Dec. 30, 1986

[54] HELICOPTER ROTOR TRANSMISSION SYSTEMS

[75] Inventor: Richard E. Moore, Los Angeles, Calif.

[73] Assignee: Hughes Helicopters, Inc., Culver City, Calif.

[21] Appl. No.: 557,607

[22] Filed: Dec. 2, 1983

Related U.S. Application Data

[63] Continuation-in-part of Ser. No. 303,962, Sep. 21, 1981, abandoned.

[51] Int. Cl.$^4$ .............................................. B64C 27/12
[52] U.S. Cl. .............................. 244/17.19; 416/170 R; 244/60
[58] Field of Search ............................. 244/17.19, 60; 416/170 R; 74/781 R, 782, 783

[56] References Cited

U.S. PATENT DOCUMENTS

| | | | |
|---|---|---|---|
| 2,378,617 | 6/1945 | Burke | 244/17.19 |
| 2,495,988 | 1/1950 | Sheppard | 74/665 H |
| 2,648,386 | 8/1953 | Tidd | 416/170 R |
| 4,200,252 | 4/1980 | Logan et al. | 244/17.19 |

Primary Examiner—Trygve M. Blix
Assistant Examiner—Rodney Corl
Attorney, Agent, or Firm—Beehler, Pavitt, Siegemund, Jagger, Martella & Dawes

[57] ABSTRACT

A fast forward flight helicopter is provided with a multiple speed helicopter rotor transmission. The transmission allows a variation in main rotor RPM or tail rotor RPM or both, dependent upon the desired flight conditions, while maintaining satisfactory lift and performance. With this means, noise is controlled without loss of aerodynamic performance. In one embodiment a helicopter is provided with a transmission for interconnecting the power input shaft through the main rotor shaft and tail rotor shaft in common. The transmission employed is a planetary gear transmission. A brake means is provided for clutching the planetary gear transmission from a first and second transmission speed so that power is continuously delivered, and shifting is accomplished in a smooth manner, thereby allowing the helicopter to remain in smooth flight. In another embodiment the main rotor is driven through the planetary gear transmission and the tail rotor is directly driven. In another embodiment a no-tail-rotor (NOTAR) helicopter is driven by the planetary gear system with the main rotor system being directly driven.

5 Claims, 6 Drawing Figures

HELICOPTER ROTOR TRANSMISSION SYSTEMS

CROSS REFERENCED APPLICATIONS

This application is a continuation-in-part application of a prior copending application filed Sept. 21, 1981, Ser. No. 303,962, now abandoned, entitled "TWO SPEED HELICOPTER ROTOR TRANSMISSION", assigned to the same assignee as the present application.

BACKGROUND OF THE INVENTION

1. Field of the Invention

The present invention relates to the field of helicopter power systems and, in particular, to helicopters designed for fast forward flight or noise control. Specifically the invention relates to helicopter rotor systems designed to operate at a plurality of rotor speeds while the engine speed remains constant.

2. Description of the Prior Art

Prior art helicopters are subject to two main disadvantages. Firstly, conventional helicopters are able to only operate effectively at high noise levels. The noise is rotor-generated noise and not necessarily engine-generated noise. In dense urban areas under domestic conditions, the noise performance levels of helicopters is subject to increasing concern and regulation. In some cases noise levels are so objectionable that helicopter flight in certain urban areas is prohibited. Moreover, in combat conditions the high noise levels inherently characterizing a high-performance rotor system prevents the attach helicopter from operating silently and providing a short range suprise approach.

Secondly, helicopter power plants in general and, in particular, high performance turbine power plants, are designed to run optimally at a single RPM. Although turbine RPM can be varied by limited amounts, such variations are always at substantial trade-offs in performance.

Therefore, the flight performance or envelope of the helicopter, including its noise performance, is largely fixed to a practical degree by the fixed RPM performance from the power plant and rotor system. Therefore, what is needed is some means wherein the rotor system, including both the main and tail rotor of a helicopter, can be operated in a flexible manner using conventional power plants characterised by substantially constant RPM outputs to vary both flight envelope and rotor noise performances in an arbitrary manner.

BRIEF SUMMARY OF THE INVENTION

The present invention is an improvement in a helicopter having a substantially constant speed engine comprising a main rotor system, a tail thrust system and a first multiple speed transmission. The tail thrust system generates at least a side thrust on the helicopter, typically as a counteracting torque. The first multiple speed transmission has its input coupled to the engine and output coupled to either the main rotor system or tail thrust system according to the desired design. By reason of this combination, the rotational speed of the main rotor system or tail thrust system, as selected, is driven with an arbitrarily selected rotational speed in order to optimize the flight envelope of the helicopter.

More particularly, in a first embodiment the first multiple speed transmission is directly coupled to the main rotor system and the tail thrust system is directly coupled to the engine without coupling through the first multiple speed transmission.

In another embodiment the first multiple speed transmission has its output coupled to the tail thrust system and the main rotor system is directly coupled to the engine without connection through the first multiple speed transmission.

The invention includes those embodiments both where the tail thrust system is a tail rotor system and where it is a rotorless tail system or NOTAR system. NOTAR is a trademark of Hughes Helicopters, Inc. of Culver City, Calif. and is used here to generally refer to the rotorless tail system as described in U.S. Pat. No. 4,200,252.

The invention further comprises a second multiple speed transmission having an input coupled to the engine. The first multiple speed transmission has an output which is coupled to either the main rotor system or tail thrust system according to the selected design. The second multiple speed transmission then has its output coupled to the main rotor system or tail thrust system, whichever one is not coupled to the first multiple speed transmission.

In another embodiment, the invention further comprises a second multiple speed transmission having an input coupled to the output of the first multiple speed transmission. The output of the second multiple speed transmission is then coupled to either the main rotor system or tail thrust system, whichever one is not directly coupled to the output of the first multiple speed transmission.

In each of the preferred embodiments, the multiple speed transmission is a two speed rotor transmission. A planetary gear transmission using a breakable clutch is employed. More particularly, the multiple speed transmission includes an input shaft, a main drive member, overrunning clutch, a sun gear, a ring gear, at least one planet gear, a planet carrier and a selectively operable brake mechanism. The overrunning clutch connects the input shaft to the drive member and transmits driving torque between the two. The sun gear is rotatable with respect to the input shaft and is concentric with it. The ring gear is concentric with the sun gear and is connected to and drives the main drive member. The planet gear meshes both the sun gear and the ring gear. The planet carrier interconnects the planet gear for rotation with the input shaft. Typically, a plurality of planet gears are coupled to the planet carrier. The brake mechanism selectively engages the sun gear and stops rotation of the sun gear relative to the input shaft. By reason of this combination of elements, the main drive member is driven at a lower speed by the overrunning clutch and the planet gears. When the brake mechanism is disengaged, the sun gear is free to rotate together with the planet gears and the input shaft. The main drive member is shiftable to a higher speed upon braking engagement of the sun gear to thereby cause the planet gears to rotate above their respective axis and mesh with the sun gear. As a result, the ring gear is driven at a higher speed.

These and other embodiments of the present invention can best be understood by now turning to the drawings as described in light of the detailed description.

BRIEF DESCRIPTION OF THE DRAWINGS

In the drawings described above like reference numerals indicate corresponding parts throughout the several views of the drawings.

DESCRIPTION OF A PREFERRED EMBODIMENT

Figure 3:
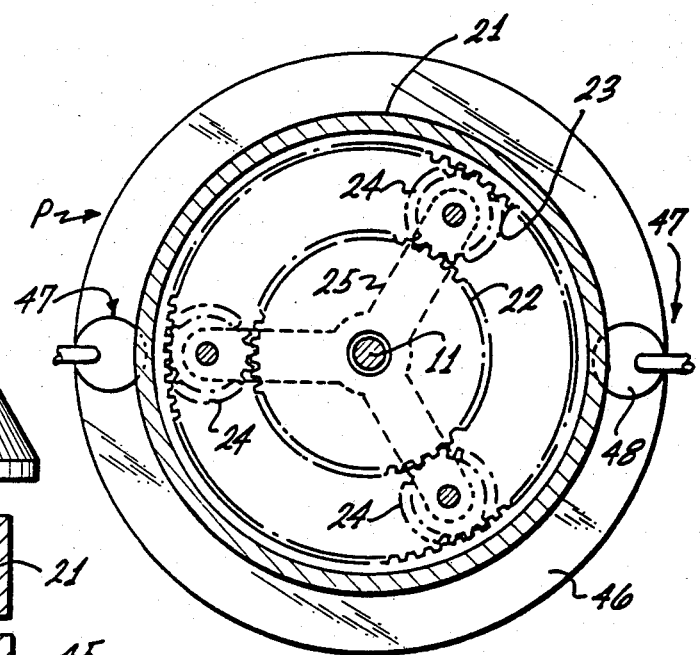
FIG. 3 is a horizontal cross section taken along line 3—3 of FIG. 2.

The present invention relates to multiple speed rotor systems wherein the main rotor and tail rotor or no-tail-rotor (NOTAR) subsystems are selectively driven at one of a multiple of speeds by an approximately constant RPM power plant. FIGS. 1, and 4–6 illustrate four embodiments of a system and FIGS. 2 and 3 illustrate a gear transmission for use in each of the system embodiments. Inasmuch as no practical gear transmission for inflight shifting has heretofore been devised, the first embodiment of the rotor system and two embodiments of the transmission shall be described in connection with FIGS. 1–4. Thereafter, additional embodiments of the invention shall be described.

Figure 1:
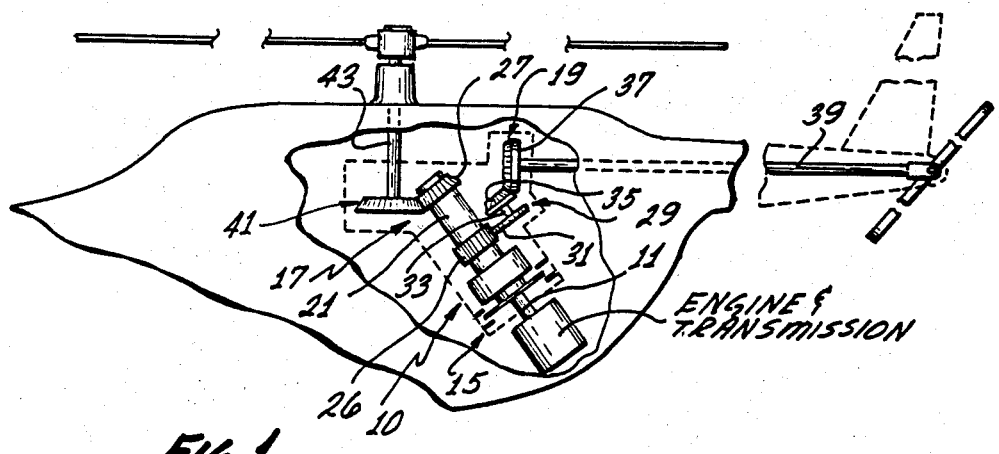
FIG. 1 is a diagrammatic representation of a first embodiment of the invention.
Figure 2:
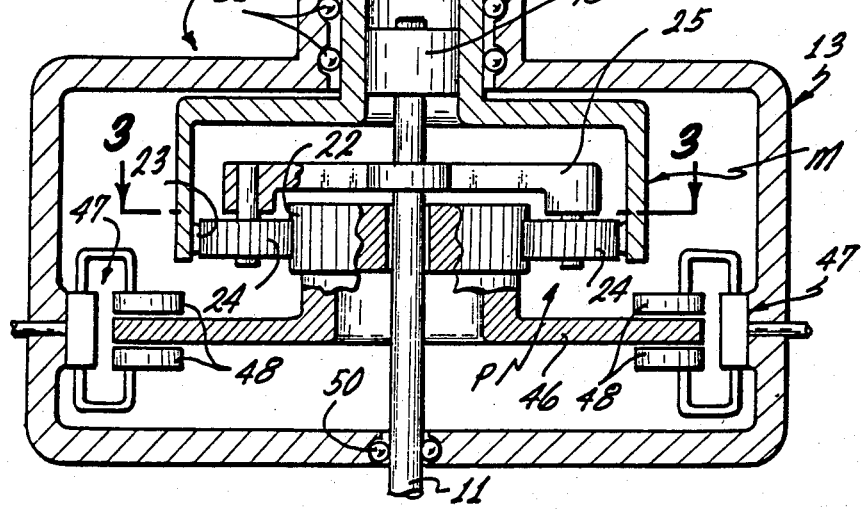
FIG. 2 is a vertical cross-sectional view of the two speed helicopter rotor transmission illustrated in schematic form in FIG. 1.

Referring now to the drawings and in particular to FIG. 1, a two speed helicopter rotor transmission of this invention is generally indicated in its entirety by reference charcter 10. Transmission 10 includes a rigid housing, as generally indicated at 13, which is adapted to be rigidly mounted within the fuselage or airframe of the helicopter in a suitable manner. In essence, transmission 10 includes a power input section as generally indicated at 15, a main rotor drive section as indicated at 17, and a tail rotor drive section as generally indicated at 19 at the upper right hand portion of transmission 10. Power from the helicopter engine is transmitted to transmission 10 by means of a conventional power train transmission coupled to a power input shaft 11 of transmission 10. The power input shaft 11 of transmission 10 is journaled relative to transmission housing 13 by means of suitable anti-friction bearings 50. A mechanism train, as generally indicated by reference character M in FIG. 2, is provided in transmission 10 for interconnecting the power input section of transmission 10 to both the main rotor drive section and to the tail rotor section in a manner as described below.

More specifically turn to FIG. 2, mechanism train M comprises a planetary gear train, as generally indicated at P, for receiving power from power input shaft 11. A main drive member, as indicated generally at 21, is rotatably mounted within housing 13 and is journaled therein by suitable anti-friction bearings 51 for being driven by the power input shaft 11 in a manner as will appear. Planetary gear train P includes a sun gear 22 rotatable relative to power input shaft 11 and journaled by suitable anti-friction bearings (not shown) relative to transmission housing 13. The planetary gear train further includes an internal ring gear 23 or main drive 21 concentric with and surrounding the sun gear. A plurality of planet gears 24 are in mesh with sun gear 22 and with ring gear 23. The planet gears are carried by planet carrier 25 interconnected to power input shaft 11 and rotatable therewith whereby the planet gears rotate around the axis of the power input shaft and around sun gear 22.

Main drive member 21 has an outer ring gear 26 formed thereon intermediate its ends and an outer bevel ring gear 27 at its outer end. Intermediate ring gear 26 meshes with an idler 29. This idler includes a spur gear 31 in mesh with intermediate ring gear 26, an idler shaft 33, and a bevel driven gear 35. This bevel driven gear 35 is in mesh with a bevel gear 37 fixedly coupled to tail rotor shaft 39 in tail rotor drive section 19. Thus, tail rotor drive shaft 39 is driven by main drive member 21 via idler 29. Of course, these above-noted gears are journaled in suitable anti-friction bearings.

The main rotor drive section 17 includes a bevel driven gear 41 in mesh with the bevel ring gear 27 on the outer end of main drive member 21 and main rotor shaft 43 is rigidly fixed to bevel gear 41 so that the main rotor shaft is driven by the main drive member. It will be appreciated that main rotor drive shaft 43 and the tail rotor drive shaft 39 are driven in fixed speed ratios relative to one another determined by the sizes of bevel gear 41 and the spur gear 31 and by the gear train interconnecting the main rotor shaft 43 to main drive ring gear 27 and by the gear train interconnecting the tail rotor shaft 39 to the intermediate ring gear 26 on the main drive member.

Further in accordance with this invention, the inner end of engine drive shaft 11 is coupled to main drive member 21 by means of overrunning clutch 45. Further, sun gear 22 also includes a brake ring or rotor 46 extending radially outwardly therefrom. The transmission 10 includes one or more selectively operable hydraulic brakes, as generally indicated at 47, for brakingly engaging the sun gear rotor and for preventing rotation of sun gear 22 relative to housing 13 and to the input shaft 11 when in its braking mode and, when in its unbraked mode, permitting the sun gear to rotate relative to the transmission housing.

The embodiment of FIG. 1 illustrated the use of the two speed transmission in a system wherein transmission 10 directly drove a conventional gear train coupled to both the main and tail rotor systems. Therefore, the embodiment of FIG. 1 entails a system wherein the rotor speeds of both the main and tail rotors are shifted in common. Turn now to the second embodiment of FIG. 4 wherein a helicopter, generally denoted by reference numeral 200, includes a conventional power plant 202. Power plant 202 is coupled through a gear train directly to tail rotor 204. The gear train includes a first gear 206 meshed with a second gear 208. Second gear 208 is coupled to a tail transmission shaft 210 which is connected at its opposing end to a first bevel gear 212. Bevel gear 212 is meshed with second bevel gear 214 which in turn is connected to a tail rotor drive shaft 216. Tail rotor drive shaft 216 in turn is disposed through the tail section of fuselage 218 and through appropriate gearing to tail rotor 204.

Figure 4:
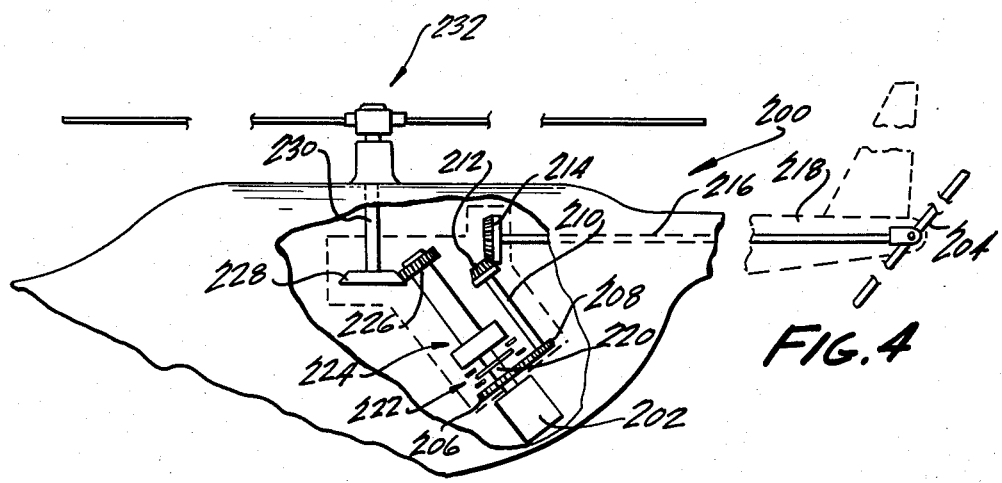
FIG. 4 is a diagrammatic cutaway side view of a second embodiment of the invention wherein the tail rotor is directly driven and the main rotor driven through the two speed helicopter rotor transmission.

Refer now to FIG. 4, power plant 202 is connected through its output shaft 220 not only to first drive gear 206 but to a clutching mechanism 222 and a two-speed transmission 224 of the type as described in connection with FIGS. 2 and 3. The output of transmission 224 in turn is coupled to a main rotor drive gear 226 which is meshed with a bevel gear 228. Bevel gear 228 in turn is connected with rotor shaft 230 which transmits the angular torque from main propulsion plant 202 to the main rotor system, generally denoted by reference numeral 232.

Therefore, FIG. 4 illustrates the second embodiment wherein a direct coupling is made to a tail rotor system through a mechanical drive chain and wherein power is coupled to the main rotor system 232 through a two speed rotor transmission 224 of the type described. Therefore, in the embodiment of FIG. 5, tail rotor system 204 will have a substantially constant speed as determined by the output RPM of propulsion plant 202. However, main rotor system 232 will have a variable RPM independently controlled by transmission 224 as may be required either to effect fast forward flight or low noise operation.

Figure 5:
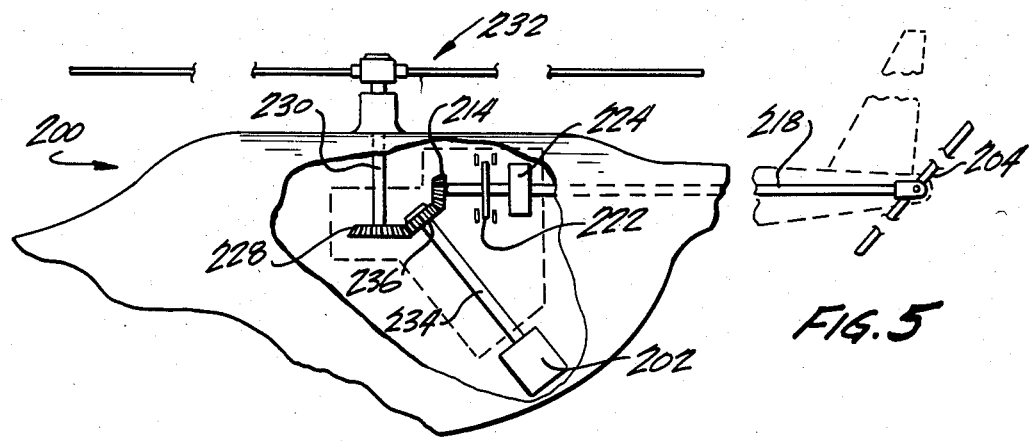
FIG. 5 is a diagrammatic cutaway side view of a third embodiment of the invention wherein the main rotor is directly driven and the tail rotor is driven through the two speed helicopter rotor transmission.
Figure 6:
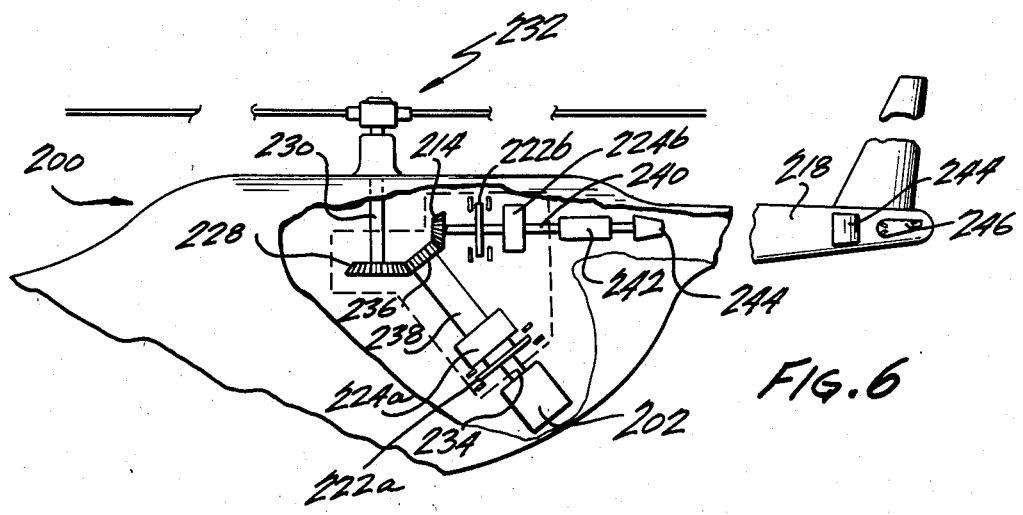
FIG. 6 is a cutaway diagrammatic side view of a fourth embodiment of the invention wherein the main and a no-tail rotor (NOTAR) rotor system is driven through a first transmission. The NOTAR system is in turn also driven through a second transmission coupled to the first transmission.

Turn now to the third embodiment as illustrated in FIG. 5. For the purposes of convenience and clarity, although the third embodiment of FIG. 5 differs substantially from that shown and described in connection with FIG. 4, like elements will be referenced by like numerals even though as a practical matter in two embodiments such like numbered elements may have a quite distinct realizations. In any case, the embodiments of FIG. 4–6 are diagrammatic and should not be taken attempting to exactly reproduce an actual system. In the third embodiment of FIG. 5, main propulsion plant 202 is directly coupled through a main transmission shaft 234 to a bevel drive gear 236 similar to gear 27 as shown in the first embodiment of FIG. 1. Drive gear 236 in turn is coupled to a rotor bevel gear 228, which as before is connected to rotor drive shaft 230 and ultimately to main rotor system 232. Similarly, drive gear 236 is coupled to second bevel gear 214. Bevel gear 214 is in turn connected to a clutch mechanism 222 and two speed rotor transmission 224 as described in connection with FIGS. 2 and 3. The output of transmission 224 is connected to tail rotor drive shaft 218 which again is ultimately coupled to and drives tail rotor system 204. In the second embodiment of FIG. 5, propulsion plant 204 is directly coupled through a mechanical gear chain to main rotor 232 while tail rotor system 204 is coupled through a two speed rotor transmission 224 as described. Therefore, main rotor 232 is driven at the substantially uniform RPM as determined by the output of propulsion plant 202 while the RPM of tail rotor system 204 can be arbitrarily and selectively changed according to the invention.

Turn now to a fourth embodiment as illustrated in diagrammatic cutaway side view in FIG. 6. Helicopter 200 of FIG. 6 also includes a main propulsion plant 202. Output shaft 234 of propulsion plant 202 is, as in the case of the embodiment of FIG. 4, connected to a clutch mechanism 222a and two speed rotor transmission 224a substantially as described in connection with FIGS. 2 and 3. The output of transmission 224a is connected through a shaft 238 to a drive bevel gear 236. Once again, bevel gear 236 is meshed with a rotor bevel gear 228. Rotor bevel gear 228 in turn drives a rotor shaft 230 which is ultimately connected to and drives a conventional main rotor system 232.

Similarly, bevel drive gear 236 is coupled to a tail bevel gear 214. As was the case with the embodiment of FIG. 5, bevel gear 214 is connected to a second clutch mechanism 220b and two speed rotor transmission 224b. The output of 224b is coupled to a turbine shaft 240 which drives a conventional air turbine 242. Turbine 242 in turn drives a NOTAR fan 244 pneumatically coupled through interior conduits within tail section 218 of the helicopter fuselage to a side thrusting louver 244 and controllable nozzle system 246 each described in greater detail in U.S. Pat. No. 4,200,252, denoted generally here as a NOTAR system.

The fourth embodiment of FIG. 6 differs from those of FIGS. 4 and 5 not only by its combination with a rotorless tail, but by inclusion of a clutch mechanism and two speed rotor transmission in both the main and tail rotor sections. In fact, the embodiment of FIG. 6 illustrates a compound combination of transmissions. In other words, main propulsion plant 202 powers both main rotor system 232 and the NOTAR system through the first clutch and gear transmission 222a and 224a. Thereafter, the selected transformed output from power plant 202 is directly coupled through a gear train to main rotor system 232 while the power delivered from the output of transmission 224a is again coupled through a second clutch mechanism and transmission 222b and 224b which powers the NOTAR system. Thus, the gear ratio selected in transmission 224a is multiplied by the ratio selected in transmission 224b theoretically providing up to two rotor speeds on the main rotor system 232 and four rotor speeds for the NOTAR system which could be selected upon flight conditions.

It is, of course, possible that the embodiment of FIG. 6 could be rearranged to create a fifth embodiment wherein main propulsion plant 202 is directly connected to both transmissions 224a and 224b in the manner suggested by combining the direct drive as shown in FIG. 4. In that fifth embodiment, the speed ratios for main rotor system and tail rotor system 204 or the NOTAR system would be independently selected thereby resulting in four distinguishable permutations of main and tail "rotor" thrust, which again could be chosen according to the desired flight envelope.

The illustrated embodiments are chosen only for the purpose of example and clarity and should not be taken as limiting the invention which is defined by the following claims.

I claim:

1. An improvement in a helicopter having a substantially constant speed rotor engine comprising:
  a main speed rotor system;
  a tail thrust means for generating at least a side thrust on said helicopter;
  a first multiple speed transmission having its input coupled to said engine and its output coupled to a selected one of said main rotor system and said tail thrust means; and
  a second multiple speed transmission having an input coupled to said engine, said first multiple speed transmission having an output coupled to said selected one of said main rotor system and tail thrust means, said second multiple speed transmission having an output coupled to the other one of said main rotor system and tail thrust means,
  whereby rotational speed of said selected one of said main rotor system and said tail thrust means is driven with an arbitrarily selected rotational speed in order to optimize the flight envelope of said helicopter.

2. An improvement in a helicopter having a substantially constant speed engine comprising:
   a main speed rotor system;
   a tail thrust means for generating at least a side thrust on said helicopter;
   a first multiple speed transmission having its input coupled to said engine and its output coupled to a selected one of said main rotor system and said tail thrust means; and
   a second multiple speed transmission having an input coupled to said output of said first multiple speed transmission, the output of said second multiple speed transmission being coupled to the other one of said main rotor system and tail thrust means,
   whereby rotational speed of said selected one of said main rotor system and said tail thrust means is driven with an arbitrarily selected rotational speed in order to optimize the flight envelope of said helicopter.

3. An improvement in a helicopter propulsion system comprising:
   a main rotor system;
   a tail thrust means generating an antitorque force on said helicopter;
   transmission means for selectively varying the rate of rotation of rotary drive generated by said engine and delivered to the main rotor system and tail thrust means, said rotary drive coupled between said engine and said main rotor system and said tail thrust means by said transmission means, said transmission means being connected to said engine, main rotor system and tail thrust means;
   wherein said transmission means includes a first multiple speed transmission having an input coupled to said rotor system and tail thrust means; and
   wherein said transmission means further comprises a second multiple speed transmission and wherein said first multiple speed transmission drives a selected one of said main rotor system and tail thrust means while said second multiple speed transmission drives the other of said main rotor system and tail thrust means,
   whereby flight performance of said main rotary system and tail thrust means may be selectively altered according to a desired flight envelope.

4. The improvement of claim 3 wherein said first multiple speed transmission directly drives said selected one of said main rotor system and tail thrust means and wherein said second multiple speed transmission is driven by said first multiple speed transmission and in turn drives the other one of said main rotor system and tail thrust means.

5. The improvement of claim 3 wherein said first multiple speed transmission directly drives a selected one of said main rotor system and tail thrust means and wherein said second multiple speed transmission directly drives the other one of said main rotor system and tail thrust means.

* * * * *